United States Patent

Bjerggaard

[11] Patent Number: 5,580,029
[45] Date of Patent: Dec. 3, 1996

[54] VALVE WITH PRESETTING FACILITY

[75] Inventor: Niels Bjerggaard, Hadsten, Denmark

[73] Assignee: Danfoss A/S, Nordborg, Denmark

[21] Appl. No.: 379,670
[22] PCT Filed: Aug. 16, 1993
[86] PCT No.: PCT/DK93/00266
   § 371 Date: Feb. 3, 1995
   § 102(e) Date: Feb. 3, 1995
[87] PCT Pub. No.: WO94/05937
   PCT Pub. Date: Mar. 17, 1994

[30] Foreign Application Priority Data

Aug. 27, 1992 [DE] Germany ............... 42 28 565.8

[51] Int. Cl.⁶ .................................... F16K 47/08
[52] U.S. Cl. ............................. 251/121; 251/208
[58] Field of Search ...................... 251/121, 208

[56] References Cited

U.S. PATENT DOCUMENTS

| | | | |
|---|---|---|---|
| 1,160,864 | 11/1915 | De Vaughn | 251/121 |
| 2,290,783 | 7/1942 | Turpin | 251/208 |
| 4,205,822 | 6/1980 | Bernat | 251/208 |
| 4,518,147 | 5/1985 | Andresen et al. | 251/121 |
| 4,715,579 | 12/1987 | Hammarstedt | 251/121 |

*Primary Examiner*—James Larson
*Attorney, Agent, or Firm*—Lee, Mann, Smith, McWilliams, Sweeney & Ohlson

[57] ABSTRACT

A valve with presetting facility has a valve housing with a rotatable sleeve. To form a present throttle, a control opening at the base of the sleeve co-operates with a control opening at a base face of the valve housing. The control opening in the base face is formed by an eccentric bore. The control opening in the end face of the base is formed by a channel which extends over a circular arc of less than 360°, is connected at one end by way of an eccentric bore to the inner space of the sleeve and has a cross section that reduces towards the other end. That allows presetting to be very precise and manufacture to be inexpensive.

9 Claims, 1 Drawing Sheet

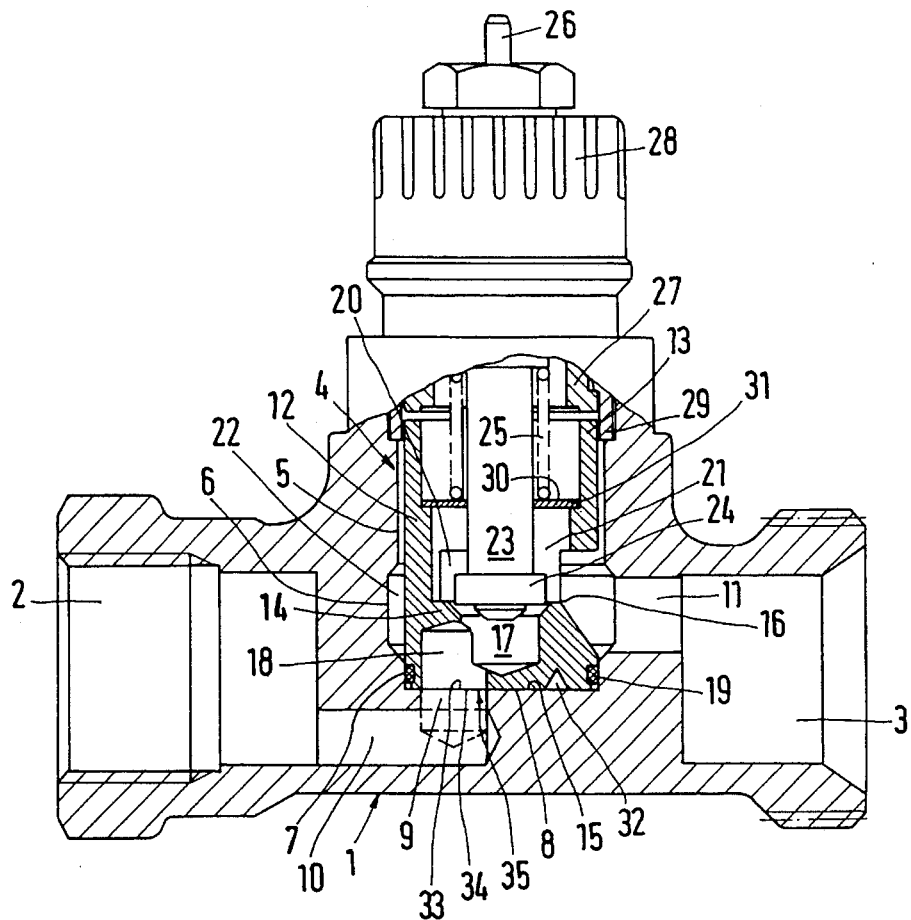

VALVE WITH PRESETTING FACILITY

BACKGROUND OF THE INVENTION

The invention relates to a valve with presetting facility, having a valve housing, which has an inlet nipple and an outlet nipple, a valve shaft, the closure member of which co-operates with a valve seat, and a cylindrical sleeve arranged concentrically about the valve shaft, which sleeve has a substantially closed base lying with its end face against a base face fixed with respect to the housing, spaced therefrom the valve seat, and in its circumferential wall at least one through-flow opening leading to the one nipple, and, in order to adjust a preset throttle that is formed by eccentrically arranged overlapping control openings in the end and base faces, the sleeve is arranged to be rotated and be fixed in position.

A valve of that kind in the form of a radiator valve is known from DE-PS 22 53 462. The presetting serves to limit the maximum flow of heating medium through the associated radiator. The two control openings are half-moon shaped openings in the base and in a plate set in the valve housing. The sleeve is coupled with a bushing that guides and seals the valve shaft, and can therefore be externally adjusted. Maximum flow volume is produced when the two control openings coincide with one another exactly. By rotating the sleeve the overlap region is reduced and thus a limit on the amount flowing through is set.

The plate set in the housing is required because it is difficult to create a half-moon shaped opening inside the valve housing. This is an expensive solution, however, because the plate has to be secured against rotation, and for that reason has a pin-like member which engages in an extra bore in the valve housing. In addition, it is difficult to set the desired flow rate exactly. That applies particularly when the flow rate is to be restricted to small amounts and in so doing the required setting tolerances are to be observed. These are as follows:

in the range from 0–10 kg/h the flow rate is +/–3 kg/h,
in the range from 11–33 kg/h the flow rate is +/–6 kg/h.

SUMMARY OF THE INVENTION

The invention is based on the problem of providing a valve of the kind mentioned in the introduction which can be manufactured at less expense and, with a simple setting procedure, allows an exact limitation to be set even at low flow rates.

This problem is solved according to the invention in that the base face is part of the valve housing, the control opening in the base face is formed by an eccentric bore that is connected by way of a transverse bore to the other nipple, and the control opening in the end face is formed by a channel which extends over a circular arc of less than 360° is connected at one end by way of an eccentric bore in the base to the inner space of the sleeve and has a cross-section that reduces towards the other end.

The preset throttle can therefore be manufactured with greater accuracy and inexpensively because only a flat base face and a bore associated therewith need to be provided in the valve housing and because providing the channel at the freely accessible base face of the sleeve, for example by milling, has no attendant problems. Adjustment is simple, because virtually a complete rotation is available as the preset range. On rotation, the channel shifts with respect to the control opening fixed in the housing. That determines the size of the overlapping area and the length of the throttling portion of the channel. Great precision is consequently achieved in the adjustment. For a given angular rotation of the sleeve, the area of overlap changes only a little and the length of the throttle passage changes in an exactly defined manner.

The channel preferably extends over a circular arc of at least 270°. In that manner, the adjustment range can comprise virtually a complete rotation.

Advantageously, the channel profile has a depth and width that reduce towards the other end. On rotation, both the top side of the channel serving as control opening and the cross-section of the channel defining a throttle passage change. The channel may have, in particular, a V-shaped cross-section.

In a further construction, provision is made for the base of the sleeve to have a concentric blind bore leading from the inner space of the sleeve to form the valve seat, and for the eccentric bore in the base to be a blind bore which intersects the concentric bore. The two intersecting bores can be made in the sleeve very easily. Shaping of the concentric bore simultaneously forms the valve seat. That makes manufacture very inexpensive.

Advantageously, the circumferential wall of the sleeve in the region of the flow openings is surrounded by an annular space, which is connected to one of the nipples. The flow is no longer obstructed by throttle resistances on the other side of the valve seat.

Advantageously, the inside of the sleeve has a step which is spaced from the valve seat and on which a shaft guide plate is supported. In this manner a comparatively long shaft can be securely held. This creates good guidance for the shaft and also guarantees that the closure member is centred in relation to the valve seat.

The shaft guide plate may moreover form a supporting face for a restoring spring acting on the shaft. The spring presses the shaft guide plate against the step so that no further fixing is required. At the same time, the sleeve is pressed with its end face against the base face, so that leakage flow, which by-passes the valve seat and the preset throttle, is avoided.

BRIEF DESCRIPTION OF THE DRAWINGS

The invention is explained in detail hereinafter with reference to an embodiment illustrated in the drawing, in which FIG. 1 shows a partial longitudinal section through a valve according to the invention, and FIG. 2 shows a view of the end face of the sleeve.

DESCRIPTION OF THE PREFERRED EMBODIMENT

The valve illustrated comprises a valve housing 1 with an inlet nipple 2 and a outlet nipple 3. At right angles to the nipple axis there is a bore 4, which has a cylindrical portion 5, an enlarged portion 6 and a second cylindrical portion 7. Furthermore, there is a flat base face 8. A bore 9 leads from the base face and is connected by way of a transverse bore 10 to the inlet nipple 2. A bore 11 leads from the enlarged portion 6 to the outlet nipple 3.

Inserted in the bore 4 there is a cylindrical sleeve 12 which has a cylindrical circumferential wall 13 and a comparatively deep base 14. The base lies with its end face 15 against the base face 8. It is provided with a central blind bore 17, the construction of which at the same time forms a valve seat 16. This blind bore intersects an eccentric blind bore 18 leading from the end face 15. In addition, the base 14 carries an O-ring 19 at the level of the cylindrical portion 7. The cylinder wall 13 of the sleeve 12 has flow openings 20 at the level of the enlarged portion 6 which lead from the inner space 21 located above the valve seat 16 and open into the annular space 22 formed by the enlarged portion 6.

A valve shaft 23 carries a closure member 24 and is loaded by a restoring spring 25 which urges the closure member into the open position. The actuation is effected manually, by means of a thermostat top unit, or in some other way by means of a pin 26. The pin is led, sealed, to the outside through a guiding and sealing means 27. A rotatable control element 28 is connected by way of a coupling 29 with the sleeve 12 such that they rotate together, so that the sleeve as a whole can be rotated about its axis. Adjustment facilities of this kind are known, for example, from DE-PS 33 00 623.

A shaft guide plate 30 rests on a step 31 of the sleeve 12. It serves simultaneously as a support for the restoring spring 25 and is held on the step by this spring. At the same time, the end face 15 of the sleeve 12 is pressed by the spring against the base face 8.

A channel 32 which extends over a circular arc of a little more than 270° is provided in the end face 15. The blind bore 18 is located at one end of the channel 32 and together with the channel forms there a control opening 33. The cross-section of the channel decreases towards the other end. This is caused by both the depth and the width of the channel 32 decreasing. In this connection, the channel has a V-shaped cross-section.

The opening of the blind bore 9 in the valve housing forms a second control opening 34 which, together with the control opening 33, forms a preset throttle 35. When the two blind bores 9 and 18 are in register, the preset throttle 35 is completely open. If the sleeve 12 is rotated by means of the control element 28, the overlapping parts of the control openings 33 and 34 become smaller and smaller. In addition, a throttle passage of increasing length and a smaller cross-section is created between the overlap point and the blind bore 18. Altogether, the presetting can therefore be very precise and accurate, enabling the required tolerances to be adhered to more closely than previously.

I claim:

1. A valve with presetting facility, having a valve housing, said housing having an inlet nipple and a outlet nipple, a valve shaft, said valve shaft having a closure member which co-operates with a valve seat, and a cylindrical sleeve arranged concentrically about the valve shaft, said sleeve having a substantially closed base lying with an end face against a base face fixed with respect to the valve housing, said base face being spaced from the valve seat and said sleeve having a circumferential wall having at least one through-flow opening leading to the outlet nipple, and, in order to adjust a preset throttle that is formed by eccentrically arranged overlapping control opening in the end and base faces, the cylindrical sleeve is arranged to be rotated and be fixed in position, and in which the base face is part of the valve housing, the control opening in the base face being formed by an eccentric bore that is connected by way of a transverse bore to the inlet nipple, and the control opening in the end face being formed by a channel which extends over a circular arc of less than 360°, being connected at one end by way of an eccentric bore in the base to an inner space of the sleeve and having a cross-section that reduces towards its other end.

2. A valve according to claim 1, in which the channel extends over a circular arc of at least 270°.

3. A valve according to claim 1, in which the channel has a profile having a depth and width that reduce towards said other end.

4. A valve according to claim 1, in which the channel has a V-shaped cross-section.

5. A valve according to claim 1, in which the base of the sleeve has a concentric blind bore leading from the inner space of the sleeve to form the valve seat, and the eccentric bore in the base is a blind bore which intersects the concentric bore.

6. A valve according to claim 5, in which the circumferential wall of the sleeve in the region of the through-flow opening is surrounded by an annular chamber, which is connected to the outlet nipple.

7. A valve according to claim 1, in which the inner space of the sleeve has a step which is spaced from the valve seat and on which a shaft guide plate is supported.

8. A valve according to claim 7, in which the shaft guide plate forms a supporting face for a restoring spring acting on the shaft.

9. A valve according to claim 1, in which the base face is surrounded by a cylindrical portion of the valve housing and the sleeve carries an O-ring forming a seal against the cylindrical portion.

* * * * *